Nov. 23, 1948.                G. R. ERICSON                2,454,311
                    FLUID PULSATOR TRANSMISSION SYSTEM
Original Filed Oct. 24, 1939                          2 Sheets-Sheet 1

INVENTOR
GEORGE R. ERICSON

ATTORNEY

Nov. 23, 1948.  G. R. ERICSON  2,454,311
FLUID PULSATOR TRANSMISSION SYSTEM
Original Filed Oct. 24, 1939  2 Sheets-Sheet 2

INVENTOR
GEORGE R. ERICSON

ATTORNEY

Patented Nov. 23, 1948

2,454,311

UNITED STATES PATENT OFFICE 2,454,311

FLUID PULSATOR TRANSMISSION SYSTEM

George R. Ericson, Kirkwood, Mo., assignor to Carter Carburetor Corporation, St. Louis, Mo., a corporation of Delaware Original application October 24, 1939, Serial No. 301,009, now Patent No. 2,317,594, dated April 27, 1943. Divided and this application June 6, 1942, Serial No. 446,153.

5 Claims. (Cl. 60—62.5)

This application is a division of my copending application, Serial No. 301,009, issued on April 27, 1943, as Patent No. 2,317,594.

This invention relates to improvements in automobiles and more particularly to improvements in engine driven systems for operating such accessories as windshield wipers and fuel pumps. These two accessories have given designers considerable difficulty, due to the fact that while they are not required to be operated at high speed, it is highly desirable that they should be driven at a fairly constant speed. This result is particularly difficult to obtain on account of the fact that the engine is operated at widely varying speeds and under substantially varying conditions of throttle opening and manifold suction. For instance, windshield wipers which have ordinarily been driven by manifold suction, may go out of operation altogether when the engine is operated under a substantial load with the throttle in wide open position, when there is not enough manifold suction to operate the wiper.

Vacuum operated fuel supply devices have been generally discarded due to the uncertainty of manifold vacuum and engine-driven fuel pumps are now in general use in place of the older vacuum tank constructions. The engine-driven fuel pump is, however, unsatisfactory under certain conditions, because it requires the fuel line to be brought close to the hot engine, thereby involving a difficulty known as "vapor lock" which is well understood by those skilled in the art and requires no further discussion here.

The object of my invention is to provide means for operating a windshield wiper and a fuel pump at a substantially uniform speed regardless of changes in the speed of the engine and the load applied thereto.

I obtain these objects by means of a novel pulsating pressure producer which may be operated electrically or by connection with a moving part of the engine. The pulsator is connected to the operated device or devices by a fluid conduit which may contain a gas or a liquid. Where a gas is used as the transmission medium, a pulsator of large capacity may be required, while the use of liquid for this purpose requires the use of diaphragms or other segregating means to insure the retention of the liquid in the system.

The invention will be better understood upon reference to the following specification and accompanying drawings, in which.

Figure 1:
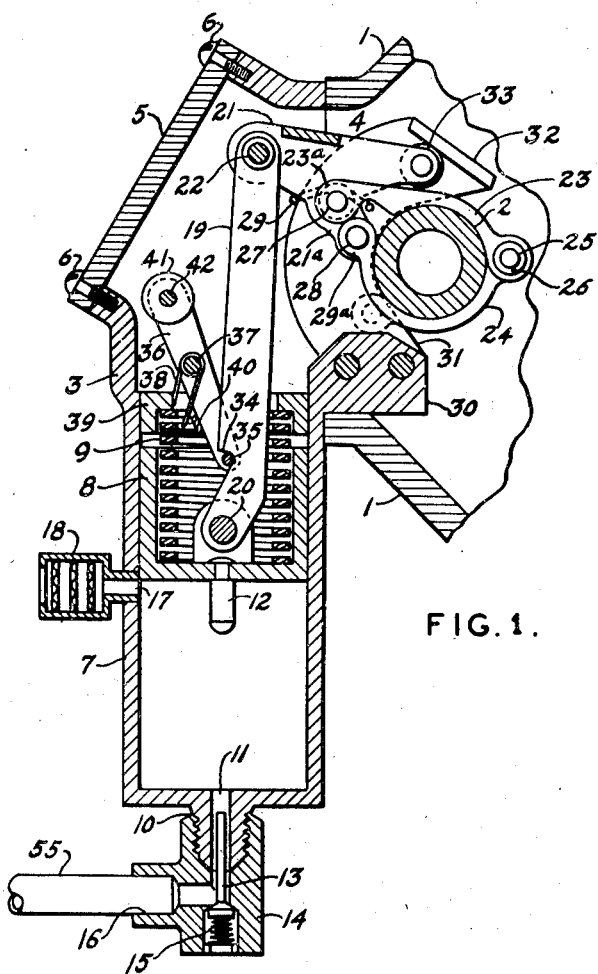
Figure 1 is a vertical sectional view of a pulsator embodying a form of the invention.

The reference numeral 1 indicates a portion of the crank case of an internal combustion engine having a conventional cam shaft 2 which, in the present construction, rotates in a clockwise direction. The pulsator comprises a body member 3, conveniently die cast, which is bolted or otherwise detachably connected to the crank case 1 over an opening 4 therein through which the operating mechanism extends. Body member 3 is provided with a hand hole which is closed by a cover 5 held in position by screws 6. A cylinder 7 is preferably formed integrally with the body member 3 and is fitted with a piston 8. The piston is urged downwardly by a coiled spring 9. This spring is formed of flat wire, as shown, in order to get the greatest possible number of turns in the space available so that the spring pressure on the piston will not drop too sharply as the piston is moved downwardly. When the piston is at the lower end of its stroke, the spring is still under substantial compression, sufficient to give approximately five (5) pounds per square inch pressure at the end of its stroke. The spring, when in its completely expanded position, as when taken completely out of the mechanism, preferably has a length at least double the length to which it must be compressed when in its most expanded position in the mechanism. With this arrangement, the pressure at the top of the stroke of the piston will be substantially less than double the pressure at the bottom of the stroke.

The lower end of cylinder 7 is provided with an outlet nipple 10, screw threaded to receive a conventional pipe fitting and provided with an accurately centered opening 11 to receive a plunger or pilot 12 carried by the piston. The function of this plunger is to enter and substantially close passage 11 when piston 8 approaches the bottom of its stroke and also to operate the relief valve 13 which is carried in the fitting 14 threadedly attached to the nipple 10. Valve 13 is yieldingly held in closed position by a spring 15. Fitting 14 is suitably arranged at 16 for attachment of branched conduit 55 leading to the operated accessories.

In order to insure the relief of any suction in cylinder 7 before the compression stroke of the piston 8 is started, I provide a port 17 in the wall of the cylinder just below the piston when at the top of its stroke. This port communicates with atmosphere through a filter 18 which is provided with screens as indicated. This filter not only serves to exclude sand and other foreign matter, but also serves to silence any popping sound which might otherwise occur when the piston uncovers the port.

Piston 8 is driven upwardly by means of a connecting rod 19 pivoted to the piston at 20 and to bifurcated operating lever 21, as indicated at 22. A jaw member 23 is connected to a cooperating spring or jaw grip member 24 by means of a pivot pin 25 which is held in place by a washer and cotter pin 26. A plurality of grip members 23 and 24 may be provided, if desired, which may be formed of slightly flexible sheet metal, stamped as shown and alternately mounted on pin 25 so as to form a laminated stack. The clutch mechanism is lubricated by the oil spray in the crankcase.

The end of member 23 opposite pin 25 has an apertured boss 23a secured to a projecting finger 21a on lever 21 by a pin 27. The bifurcation of lever 21 is also pivotally connected to apertured boss 29a in gripping member 24 by a pin 28. A coiled spring 29 is wound around pin 27 and has one end hooked under gripping member 23 and the other end hooked under lever 21. This spring is constantly in tension so as to bias lever 21 in a clockwise direction relative to pin 27 and to bias member 23 in the opposite direction.

Body member 3 carries a projection 30 to which is attached a pair of brackets, one of which is shown at 31. These brackets are inturned at their upper ends, as at 32, to form cam elements or stops for engaging rollers 33 mounted on the bifurcations of lever 21. The positioning of cam elements 32 is such that when lever 21 is being carried clockwise around the cam shaft, contact of rollers 33 with the cam elements will cause lever 21 to be rotated in a clockwise direction about these rollers in a manner to urge gripping members 23 and 24 apart and release the cam shaft.

In order to produce a slight pause in the action of piston 8 at the top of its stroke and prior to the compression stroke, connecting rod 19 is provided with a notch 34 into which a pin or detent 35 may be dropped. Pin 35 is carried at one end of a double lever 36 which is pivotally mounted on a pin 42 in body member 3. A coiled spring 38 has a pair of projecting arms, one of which contacts the spring seat member 39 and the other of which rests against the bridge member 40 which joins the two sides of double lever 36. A weight 41 is attached to the upper end of double lever 36 by a pin, as indicated at 42.

Figure 2:
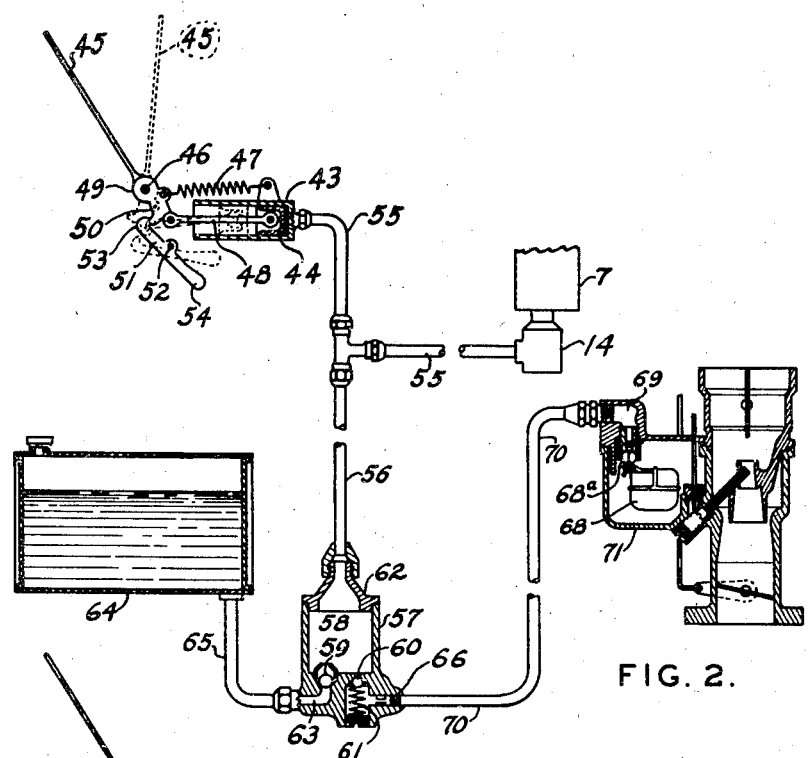
Figure 2 is a diagrammatic representation, parts being sectioned, showing a pressure operated system embodying the invention and as applied to an automobile.

The windshield wiper motor (Fig. 2) comprises a cylinder 43 receiving reciprocating piston 44. The windshield wiper blade 45 is pivoted at 46 and yieldably urged toward one extreme position by a tension spring 47. A connection rod 48 connects piston 43 and the operating lever 50 of the wiper blade having an apertured boss 49 rigid with the wiper shaft. When it is desired to stop the wiper movement, a lever 51, pivoted at 52 and provided with a hook 53, is moved into the path of lever 50 by means of the handle 54. When it is desired to have the windshield wiper operate, lever 51 is turned slightly in an anti-clockwise direction so that the projection 53 is no longer in the path of the projection 50.

Cylinder 43 is connected by means of conduit 55 to the fitting 14, and another branch 56 of the conduit leads to what may be termed the pressure translating device 57 which consists of a chambered body member 58 having inlet and outlet check valves 59 and 60, respectively. The inlet check valve, in the present case, is held in closed position merely by its own weight, while the outlet check valve is lightly held in closed position by a small spring 61. The upper part of chamber 58 is closed by a plug 62 which is provided with suitable pipe fittings for connection to fluid pressure branch 56. The inlet passageway 63 is connected to the fuel tank 64 by means of the conduit 65. Device 57 is preferably mounted in or adjacent the fuel tank 64, but it may be mounted on the carburetor itself, or at a point on the chassis of the vehicle near the engine, but, preferably not under the hood—at least in engines where a great deal of heat is developed at that point. The outlet passageway 66 of device 57 is connected to the carburetor of the engine.

In operation, with the engine at rest, spring 9 (Fig. 1) holds piston 8 at the lower end of its stroke and pilot 12 contacts the stem of the valve 13, holding it in open position so as to expose conduits 55 and 56 to atmospheric pressure conditions. The lowermost position of piston 8 is determined by engagement of boss 29a and lever extension 21a with projection 30. In this position of the parts, spring 9 overcomes spring 29 and rotates pin 27 counterclockwise sufficiently relative to pin 28 to cause members 23 and 24 to tightly grip cam shaft 2. Pin 35 is yieldingly held against rod 19 by spring 38. Clockwise rotation of the cam shaft from this position carries the frictional clutch mechanism upwardly, lifting piston 8 and compressing spring 9.

During the first part of the upward movement of piston 8, pilot 12 releases valve 13 to permit its closure by spring 15 and then clears passage 11 so as to expose conduits 55 and 56 to suction produced by the receding piston. During continued upward movement of the piston, a quantity of fuel is drawn into device 57 past inlet check 59 and suction is communicated to windshield wiper cylinder 43. When piston 8 uncovers port 17 in its upward movment, suction in cylinder 7 is relieved, and conditions in the fluid system again approach a state of equilibrium. Near the top of the stroke of piston 8, spring 38 forces pin detent 35 into notch 34 and roller 33 strikes cam element 32. A slight additional clockwise rotation of lever 21 about rollers 33 produces clockwise rotation of pin 27 relative to pin 28 which releases the clutch mechanism. Spring 29 then holds the clutch mechanism released to be returned to the initial position at a substantially uniform rate by spring 9. The return or discharge stroke is delayed until pin 35 is forced out of notch 34 due to the superior pressure of spring 9. Preferably the outlet connection 66 in chamber 58 is slightly restricted, as indicated at 67, so that the discharge of the liquid from this chamber will be sufficiently slow to build up back pressure to open the windshield wiper. The pump discharge through tube 70 is also restricted or cut off by the needle valve 68a in inlet 69 and controlled by float 68 in carburetor float bowl 71.

When windshield wiper piston 44 has reached the end of its outward stroke (Fig. 2) and when no more fuel can be discharged from the chamber 58 due to the action of needle valve 68a, pulsator piston 8 is still capable of reaching the end of its stroke by building up compression in the passages 55 and 56 and the chamber 58 due to the compressibility of the fluid therein. Also, there may be some leakage around piston 8.

The entry of pilot 12 into passageway 11 serves to restrict the discharge of air from cylinder 7 during the last part of the stroke so as to cushion the reversal of valves 59 and 60 and piston 44. Pilot 12 also opens valve 13 and relieves any pressure remaining in cylinder 43 and chamber 58. This permits spring 47 to return the wiper blade and piston 44 to the inlet end of cylinder 43. The pressure of spring 15 on relief valve 13 is such that where the engine is using a very small amount of fuel excessive pressure in the system may be relieved through passage 11.

The last action of the pressure stroke of piston 8 is to again bring boss 29a on member 24 into contact with extension 30 and reengage the clutch mechanism with the cam shaft so as to repeat the cycle.

Figure 3:
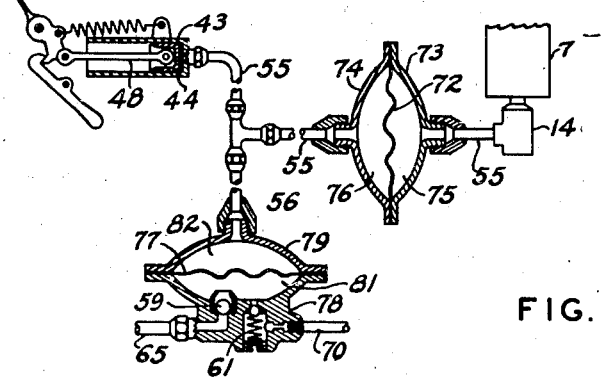
Figure 3 is a diagrammatic representation of a system embodying another form of the invention.

Fig. 3 shows a form of the invention which may be advantageously utilized where the fluid connections are of such length that unsatisfactory operation results due to dampening out of the pulsations. In this form, pulsating air pressure from pulsator chamber 7 is applied directly to a flexible diaphragm 72 interposed in tube 55 and secured between hollowed caps 73 and 74 forming chambers 75 and 76, respectively. Cap members 73 and 74 are provided with suitable pipe fittings for connection into conduit 55. A second diaphragm 77 mounted between hollowed cap members 78 and 79 is inserted in connection 56. Lower cap member 78 carries inlet and outlet check valves 59 and 60, identical with the corresponding parts in Fig. 2. The windshield wiper mechanism is also identical with that in Fig. 2.

Conduits 55 and 56 and chambers 76 and 82 are filled with a suitable liquid which serves as a non-compressible medium for transmitting the pulsations produced in diaphragm 72 by the pulsator to fuel pumping diaphragms 77 and windshield wiper piston 44. A third diaphragm may be inserted in connection 55 adjacent cylinder 43, if desired. The diaphragms are particularly desirable in a closed liquid system as shown, but one or more of these may be used with the air or gaseous system shown in Fig. 2 in order to prevent escape of the transmitting fluid. For instance, a diaphragm may be advantageously mounted in chamber 58 to prevent fuel vapors from being drawn into the pulsator mechanism.

The invention may be embodied in other forms than those shown, as will occur to those skilled in the art, and the exclusive use of all such modifications as come within the scope of the appended claims is contemplated.

I claim:

1. In a motor vehicle having an engine operable at a variable speed, and a device adapted to be driven at a more nearly constant speed, a fluid motor for operating said device, a fluid pulsation transmitting means including an operating cylinder having a fluid line connected to said fluid motor, a piston for said operating cylinder, a device for connecting said piston to a driven part of said engine to move said piston in one direction, means for disconnecting said piston from said driven part of said engine at the end of a predetermined stroke, and spring means for returning said piston to the other end of its stroke.

2. In a motor vehicle having an engine operable at a variable speed, and an accessory device adapted to be driven at a more nearly constant speed, a fluid motor for operating said accessory device, a pulsation transmitting means including an operating cylinder having a fluid line connected to said fluid motor, a piston for said operating cylinder, a device for connecting said piston to a driven part of said engine to move said piston in one direction, means for disconnecting said piston from said driven part of said engine at the end of a predetermined stroke, spring means for returning said piston to the other end of its stroke, and means for reconnecting said piston to said driven part of said engine at the end of its predetermined stroke.

3. In combination with an engine having a part movable at variable speeds, a device driven by a fluid motor, and a pulsator device including a piston, said pulsator having a fluid connection to said motor, means connecting said piston to said engine part for operation thereby during a portion of its cycle, and means for operating said piston during the remainder of its cycle independently of said engine part and at a speed independent of the speed of the engine.

4. In combination with an engine having a part movable at variable speeds, an accessory device driven by a fluid motor, and a pulsator device having a fluid connection to said motor, a connection to said engine part for operation of said pulsator device thereby to cause pulsation, means for disconnecting said pulsator device from said engine part, and means to operate said pulsator device independently of said movable part and at a uniform speed independent of the speed of the engine.

5. In combination with an engine having a part movable at variable speeds, an accessory device operated by a fluid motor, and a pulsator device having a fluid connection to said motor, a connection to said engine part for operation of said pulsator device thereby to cause pulsations, means intermittently rendering said connection ineffective, and means to continue operation of said pulsator device at a slower speed whereby the cyclical speed of said accessory device is substantially less than that of said engine part.

GEORGE R. ERICSON.

REFERENCES CITED

The following references are of record in the file of this patent:

UNITED STATES PATENTS

| Number | Name | Date |
|---|---|---|
| 1,026,521 | Marcou | May 14, 1912 |
| 1,398,291 | Arbuckle | Nov. 29, 1921 |
| 1,405,595 | Kapterer | Feb. 7, 1922 |
| 1,457,033 | Jorgenson | May 29, 1923 |
| 1,488,121 | Johnson | Mar. 25, 1924 |
| 1,646,676 | Atkinson | Oct. 25, 1927 |
| 1,698,419 | Wappler | Jan. 8, 1929 |
| 2,042,897 | Horton | June 2, 1936 |
| 2,262,814 | Norvell | Nov. 18, 1941 |
| 2,292,527 | Kraft | Aug. 11, 1942 |
| 2,317,594 | Ericson | Apr. 27, 1943 |

FOREIGN PATENTS

| Number | Country | Date |
|---|---|---|
| 260,175 | Great Britain | 1926 |
| 319,770 | Germany | Apr. 3, 1920 |